Feb. 21, 1950     D. WEISS     2,498,118

CONTINUOUSLY MEASURING ANGULAR ACCELEROMETER

Filed Feb. 24, 1945

INVENTOR.
DAVID WEISS.

BY Ralph L. Chappell
ATTORNEY.

Patented Feb. 21, 1950

2,498,118

UNITED STATES PATENT OFFICE 2,498,118

CONTINUOUSLY MEASURING ANGULAR ACCELEROMETER

David Weiss, Philadelphia, Pa.

Application February 24, 1945, Serial No. 579,640

6 Claims. (Cl. 264—1)

(Granted under the act of March 3, 1883, as amended April 30, 1928; 370 O. G. 757)

This invention relates to new and useful improvements in measuring instruments and more particularly to instruments for continuously measuring angular accelerations of an accelerated body. The invention is particularly adapted to measurement and continuous recording of the angular accelerations in pitch, roll and yaw of an airplane.

It is frequently required in tests of airplanes and other structural bodies to determine, for example, the pitch, roll or yaw accelerations of the plane or body. Heretofore, it has been the practice to attempt to measure these acceleration characteristics by the use of two linear accelerometers of conventional type. However, the determination of such accelerations by the use of linear accelerometers must be based upon simplifying assumptions that do not always hold true, and hence the measurement of such accelerations by this method are inaccurate and at best merely an estimate.

With the foregoing in mind, the present invention has for its principal object the provision of a continuously measuring angular accelerometer for determining the angular accelerations of an accelerated body.

Another object of the present invention is to provide a continuously measuring angular accelerometer of the character set forth that is extremely accurate and not responsive to linear accelerations.

Another object of the invention is to provide a novel continuously measuring angular accelerometer as set forth wherein friction is minimized to an extent that the instrument exhibits a free vibration damping coefficient less than one percent of critical damping.

A further object of the invention is to provide a novel continuously measuring angular accelerometer having the stated characteristics wherein the natural frequency and sensitivity of the instrument may be simply and quickly changed as desired.

A further object of the invention is to provide a novel continuously measuring angular accelerometer of the stated character which is self-balancing, and does not require additional or extraneous balancing units or equipment.

A still further object of the invention is to provide a novel continuously measuring angular accelerometer of the type described that is characterized by its relatively simplified and inexpensive construction.

These and other objects of the invention, and the various features and details of the construction and operation thereof, are hereinafter fully set forth and described with reference to the accompanying drawing, in which.

Figure 1:
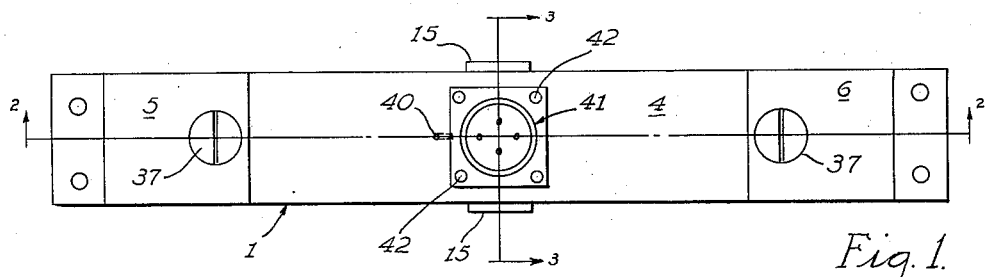
Fig. 1 is a top plan view of an angular accelerometer embodying the present invention.
Figure 2:
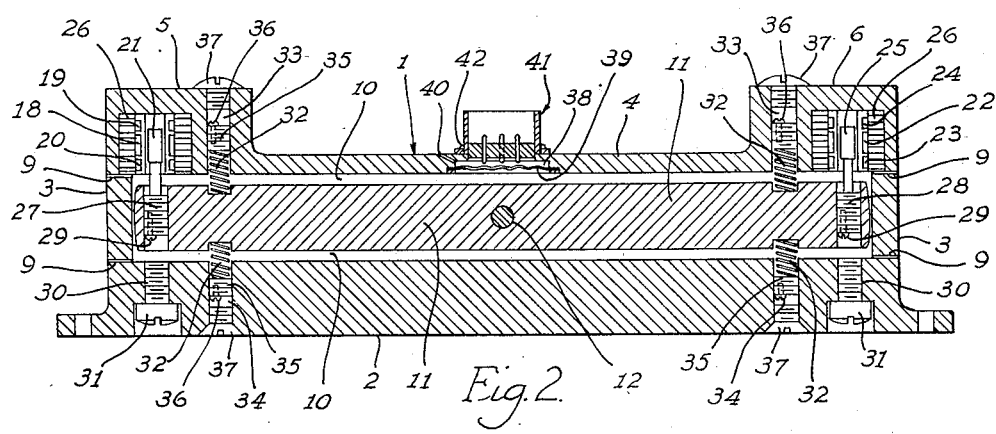
Fig. 2 is a sectional view taken on line 2—2, Fig. 1.
Figure 3:
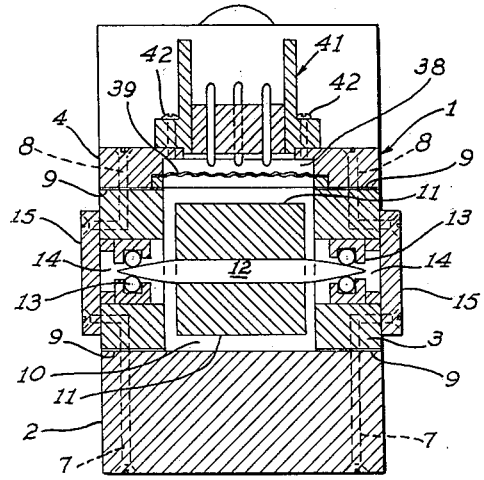
Fig. 3 is an enlarged sectional view taken on line 3—3, Fig. 1.

Referring now to the drawing, and particularly to Figs. 1, 2 and 3 thereof, a continuously measuring angular accelerometer made according to the present invention may comprise a casing structure, generally designated by numeral 1, composed essentially of a base member 2, a hollow rectangular shaped side and end wall member 3 and a cover member 4, the latter having raised housing portions 5 and 6, respectively, at its opposite ends. The bottom or base member 2 is secured to the superimposed side and end wall member 3 by any suitable means such as screws 7, and the cover member 4 is similarly secured upon the said wall member 3 by screws or the like 8, suitable gaskets 9 being interposed, respectively, between the base 2 and wall member 3 and between the latter and the cover member 4. From the foregoing construction it will be observed that the base 2, wall 3 and cover 4 cooperate collectively to form internally thereof a substantially fluid-tight elongated chamber 10 that may be approximately square in cross-section.

Mounted within the chamber 10 for pivotal movement about its transverse axis with respect to the enclosing casing structure is an elongated beam member 11 that is dimensioned so as to occupy the greater part of the chamber 10. The beam member 11 is pivotally mounted within the casing structure by means of a centrally located transverse shaft or pin element 12 that extends entirely through the said beam member 11 at its midpoint lengthwise thereof and has its opposite free end portions suitably tapered or cone shaped as best shown in Fig. 3 of the drawing. These tapered or conical ends of the pin 12 are journalled in suitable ball bearings 13 mounted in openings 14 provided in the side portions of the wall member 3, and enclosed by means of suitable cover plates or the like 15. By this construction friction is minimized to an extent that free vibration of the member 11 exhibits a damping coefficient less than one percent (1%) of critical damping.

The casing structure comprising the base 2, wall member 3 and cover 4 may be fabricated of any suitable material such as metal, and, for the sake of lightness in weight, devices embodying the invention that have been manufactured to the present time have been made of aluminum or similar metal. In the case of the beam member 11, a relatively high moment of inertia is desired and to this end the said beam member 11 may be composed of a comparatively heavy metal such as, for example, brass.

Mounted within the raised end housing portions 5 and 6 of the cover 4 of the casing structure are differential transformers generally designated 16 and 17, respectively. The transformer 16 is comprised of a single primary winding 18 and secondary windings 19 and 20 at opposite sides thereof, all arranged concentrically with respect to the path of travel of a central, axially movable core member 21 that is composed of powdered iron. Similarly, the transformer 17 is comprised of a primary winding 22, secondary windings 23 and 24 and a powdered iron core member 25 arranged as aforesaid. In order that operation of the transformers 16 and 17 may be as independent as possible of any effect of the surrounding metal casing structure, the several windings of each of the transformers are housed within a bushing or support 26 of suitable dielectric material such as, for example, "Bakelite."

According to the present invention, and as best shown in Fig. 2 of the drawing, the transformer cores 21 and 25, are carried by suitable supports 27 and 28, respectively, that are threaded, and therefore adjustably mounted, in the opposite ends of the pivotal beam member 11, the construction and arrangement being such that pivotal movement of the beam member 11 about its transverse axis on the pivot pin 12, causes the transformer cores 21 and 25 to move, respectively, in equal but opposite directions with respect to their associated windings. Adjustment of the transformer cores 21 and 25 with respect to the beam 11, and hence with respect to the transformer windings, may be obtained merely by rotation of their threaded supports 27 and 28 in the appropriate direction relative to the beam and suitable locking means such as a screw 29 is provided to secure each support in the position to which adjusted. Access to the supports 27 and 28 for adjustment thereof may be had through openings 30 in the base 2 that are at other times closed by suitable screws or the like 31 so that the casing structure 1 is maintained in a fluid-tight condition.

Pivotal movement of the beam member 11 about its transverse axis is opposed, and its natural frequency of oscillation controlled, by means of suitable coil springs or the like 32 disposed in suitable openings 33 and 34 in the cover and base members 2 and 3, respectively, and arranged in paired opposing relation with respect to the beam 11 adjacent each end thereof, the inner ends of said springs 32 being seated in suitable sockets or recesses provided in the beam member 11 as shown. The force of the springs 32 may be individually adjusted, and balanced with respect to one another, by means of screw plugs 35 threaded into the casing openings 33 and 34, and provided with devices such as screws 36 for securing the plugs 35 in the positions to which adjusted. The openings 33 and 34 may be closed to insure the fluid-tight condition of the casing 1 by suitable screws or the like 37. Apart from the flexibility and variation afforded by making the plugs 35 adjustable, as aforesaid, it will be apparent that the natural frequency and sensitivity of the device may be increased or decreased by removing any given set of springs 32 and substituting therefor a stiffer or weaker set of springs as the case may require.

Undesired vibration of the beam-spring assembly in response to high frequency accelerations applied thereto, may be damped effectively by filling the portion of the chamber 10 surrounding the beam 11 with a suitable viscous liquid that is characterized by a substantially constant viscosity factor. For this purpose, certain classes of substances manufactured by the Dow-Corning Company of Midland, Michigan, and sold commercially under the trade name "Silicones," have proven satisfactory, and provided an optimum damping of the beam-spring assembly that is of the order of seventy percent (70%) of critical damping.

To allow for thermal expansion of the damping fluid at elevated temperatures, there is formed centrally of the cover member 4 an opening 38 in which is secured in fluid-tight relation a flexible diaphragm 39 that is expansible and contractible in response to volumetric changes of the damping liquid in the chamber 10, the exterior or outer side of the said diaphragm 39 being vented to the atmosphere through a suitable port or vent 40 in the cover 4.

Also mounted centrally of the cover member 4 and overlying the diaphragm 39 is a four-prong socket type connector 41, for the transformer lead conductors, that is secured, for example, coaxially of the cover opening 38, by means of screws or the like 42. The conductors interconnecting the several transformer windings, and leading to the prongs of the connector 41 for connection to external equipment, all as hereinafter described in detail, preferably are embedded and sealed within grooves (not shown) appropriately located and formed in the inner face of the casing cover member 4 so that none of the wiring is subject to wear arising from relative motion of the beam-spring assembly of the instrument.

Figure 4:
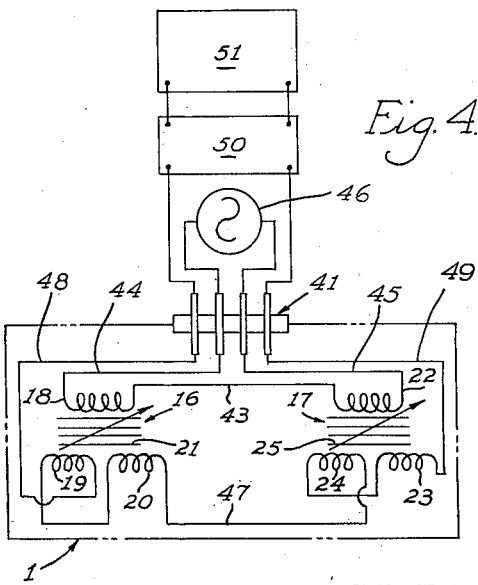
Fig. 4 is a circuit diagram, including the angular accelerometer, that is operable to measure continuously and record the angular accelerations of an accelerated body.

According to the present invention, and referring to Fig. 4 of the drawing, the primary windings 18 and 22 of the transformers 16 and 17 are serially connected together by a conductor 43 and by means of conductors 44 and 45, are connected in series circuit relation with a conventional type of electronic oscillator 46 that is operable to impress a given high frequency alternating current voltage on the primary windings 18 and 22. On the other hand, the two secondary windings 19 and 20 of the transformer 16 are oppositely wound with respect to one another and connected in series with the similarly related secondary windings 23 and 24 of the other transformer 17 by means of a conductor 47, the other terminals of the serially connected windings of said transformers 16 and 17 being connected, respectively, by conductors 48 and 49 to the input terminals of any conventional type of current amplifying device 50, the output of which is connected to a suitable indicating or recording device such as, for example, a conventional type of recording galvanometer 51. Thus, the electrical connections leading to and from the transformers 16 and 17 of the device exteriorly thereof comprise merely the primary conductors 44, 45 and the secondary conductors 48 and 49, and interconnection of these with the appropriate conductors within the cover member 4 may be conveniently effected by means of the four-prong plug and socket type connector 41 previously described.

The construction and arrangement of the transformer windings is such that when an alternating current voltage is impressed upon the primary, the voltage output across the secondary will depend upon the relative position of the transformer cores 21 and 25 axially with respect to said windings. Furthermore, the secondary windings of each transformer 16 and 17 are arranged with respect to their primary winding so that when the core thereof is centrally located; that is, midway of the axial length of the transformer windings, the voltage output of the secondary is zero, and it has been established that for a given applied voltage, the secondary voltage output is directly proportional to the amount of displacement of the core from its central or zero position. In addition, the two transformers 16 and 17 are interconnected and arranged, and the cores 21 and 25 are adjusted with respect thereto, so that an inward (downward) movement of the core 21 of transformer 16 produces a voltage change exactly the same as that produced by an equal outward (upward) movement of core 25 of transformer 17, and vice versa. This arrangement gives the instrument symmetry and also operates to cancel the effect of any possible deflection of the beam 11 due to linear accelerations.

It will be obvious of course that the device must first be put into electrical balance and the cores 21 and 25 adjusted relative to one another and to the transformer windings so that the secondary voltage output is zero when the instrument is not subject to angular accelerations. This may be accomplished by adjustment of the cores relative to the beam member 11 and the windings of the transformers, as aforesaid, or by varying the spring force on any one or more of the springs 32. However, both of these adjustments may be employed jointly as desired.

In the use of the device of the present invention, for example, to determine the angular acceleration encountered in the pitch, roll or yaw motions of an airplane, the instrument is securely mounted in the plane or body to be tested so that the axis of the pivot pin 12 is parallel to the axis of the body about which it is desired to measure angular acceleration. An angular acceleration applied to the body thus will produce an angular deflection of the beam 11 relative to its casing structure 1 that is proportional to the angular acceleration of the body and cause a corresponding relative displacement of the transformer cores 21 and 25 with respect to their associated windings thereby producing a variation or change in the voltage output across the secondary windings of the transformers. As previously stated, the output voltage of the transformer secondaries is directly proportional to the displacement of the cores 21 and 25 from their zero position, and since angular deflection of the beam 11 relative to the casing is proportional to the angular acceleration of the body being tested, the instrument can readily and easily be calibrated to give the angular acceleration of the body for any given secondary voltage output of the transformers. Furthermore it has been determined that the change is secondary voltage output is linear with respect to angular acceleration over a large range; that is, a plot of the voltage output against angular acceleration produces a straight line graph, and hence the angular acceleration of a body, such as an airplane, may be readily and continuously determined from the magnitude of the secondary output voltage of the transformer as recorded, for example, on the recording galvanometer 51 or similar device.

In lieu of the particular differential transformers herein illustrated and described, it will be obvious that other electro-mechanical translating means operable in response to angular deflection of the beam member 11, for example, a conventional Wheatstone bridge arrangement, may be employed to register the angular accelerations of a body to which the instrument may be secured. Similarly, in lieu of the fluid means employed to damp free vibration of the beam-spring assembly, effective use may be made of an arrangement embodying magnetic damping utilizing Foucault's well known principle.

From the foregoing description, it will be observed that the present invention provides a novel angular accelerometer for continuously measuring angular accelerations that is accurate and efficient in operation and which is not responsive to, or affected by, linear accelerations. The invention also provides an instrument that is characterized by a free vibration damping coefficient that is less than one percent of critical damping, and wherein the natural frequency and sensitivity of the instrument may be simply and quickly adjusted and changed as desired. Furthermore, an instrument made according to the present invention requires no extraneous balancing units or equipment and is otherwise characterized by its relatively simplified and inexpensive construction.

While a particular embodiment of the invention has been illustrated and described herein, it is not intended that the invention be limited to such disclosure, but that changes and modifications may be made and incorporated within the scope of the following claims.

The invention described herein may be manufactured and used by or for the Government of the United States of America for governmental purposes without the payment of any royalties thereon or therefor.

I claim:

1. An instrument for continuously measuring angular accelerations of an accelerated body, comprising a supporting structure to be mounted on the body, a member mounted for pivotal movement relative to said supporting structure arranged so that angular accelerations of the body about an axis parallel to the pivot axis of the member effect a continuous proportional angular deflection response of the member relative to the supporting structure, and electro-mechanical translating means including a movable element, operable in response to angular deflections of said member to register the amount thereof.

2. An instrument of the character described, comprising a support to be mounted on a body, a member pivotally mounted with respect to said support and arranged so that angular accelerations of the body about an axis parallel to the pivot axis of the member effect a continuous proportional angular deflection response of said member relative to the support, means connected to said support to receive an applied electrical potential, and means movable by angular deflection of the member operable to modulate said applied potential proportionally with respect to the angular accelerations of the body.

3. An instrument for continuously measuring the angular accelerations of an accelerated body, comprising a supporting structure to be mounted on the body, a member pivotally mounted with respect to said supporting structure and arranged so that angular accelerations of the body about an axis parallel to the pivot axis of the member effect a continuous proportional angular deflection response of said member relative to the supporting structure, primary and secondary transformer windings fixedly mounted with respect to said supporting structure, and means carried by said pivotally mounted member movable relative to said windings a distance corresponding to the angular deflection of said member and operable to effect a variation in the voltage output of said secondary windings proportional to the angular acceleration of said body.

4. An instrument for continuously measuring the angular accelerations of an accelerated body, comprising a supporting structure to be mounted on the body, a member pivotally mounted with respect to said supporting structure and arranged so that angular accelerations of the body about an axis parallel to the pivot axis of the member effect a continuous proportional angular deflection response of said member relative to the supporting structure, spring means cooperatively disposed with respect to the supporting structure and member to control the natural oscillation frequency of angular deflections of said member, means operable to adjust and regulate the force of said spring means, fluid means associated with said member operable to effect optimum damping of the free vibrations thereof, primary and secondary transformer windings fixedly mounted with respect to said supporting structure, and means carried by said pivotally mounted member movable relative to said windings a distance corresponding to the angular deflection of said member operable to effect a variation in the voltage output of said secondary windings proportional to the angular acceleration of said body.

5. An instrument for continuously measuring the angular accelerations of an accelerated body, comprising a casing defining a fluid-tight chamber adapted to be mounted on the body, an elongated member in the chamber defined by said casing, means pivotally mounting said elongated member with respect to said casing to effect a continuous proportional angular deflection response of the member relative thereto about the median transverse axis of said elongated member in response to angular accelerations of said body about an axis parallel to the pivot axis of the member, spring means interposed between the casing and member to control the natural oscillation frequency of angular deflections of the latter and to relieve the pivot of the load of the elongated member, means operable to adjust and regulate the force of said spring means, a fluid filling the chamber surrounding said member operable to effect optimum damping of the free vibrations thereof, primary and secondary transformer windings fixedly mounted in said casing adjacent each end of said elongated member, a core member carried by each end of the elongated member arranged for movement relative to the adjacent transformer windings a distance corresponding to the angular deflection of the member operable to effect a variation in the voltage of said secondary windings proportional to the angular acceleration of the body.

6. A continuously measuring angular accelerometer comprising a support, a member pivotally mounted with respect to said support and arranged so that angular accelerations about an axis parallel to the pivot axis of said member effect a continuous angular deflection response of said member relative to said support, an electrical element having a continuously variable characteristic mounted on said support, and means carried by said member and movable therewith to vary said characteristic proportionally with respect to the angular accelerations.

DAVID WEISS.

REFERENCES CITED

The following references are of record in the file of this patent:

UNITED STATES PATENTS

| Number | Name | Date |
|---|---|---|
| 1,300,513 | Taylor | Apr. 15, 1919 |
| 2,108,695 | Tapley | Feb. 15, 1938 |
| 2,268,956 | Mestas | Jan. 6, 1942 |
| 2,302,670 | Buchanan | Nov. 24, 1942 |
| 2,310,213 | Buchanan | Feb. 9, 1943 |
| 2,320,505 | Bendar | June 1, 1943 |
| 2,338,732 | Nosker | Jan. 11, 1944 |
| 2,361,788 | Neff | Oct. 31, 1944 |